(12) United States Patent
Schmidt et al.

(10) Patent No.: US 8,181,532 B2
(45) Date of Patent: May 22, 2012

(54) STRUCTURAL DEFLECTION AND LOAD MEASURING DEVICE

(75) Inventors: Robert Kyle Schmidt, Pickering (CA); Nader Abu El-samid, Toronto (CA)

(73) Assignee: Messier-Dowty Inc. (CA)

( * ) Notice: Subject to any disclaimer, the term of this patent is extended or adjusted under 35 U.S.C. 154(b) by 1244 days.

(21) Appl. No.: 11/573,218

(22) PCT Filed: Aug. 30, 2005

(86) PCT No.: PCT/CA2005/001304
§ 371 (c)(1),
(2), (4) Date: Sep. 25, 2007

(87) PCT Pub. No.: WO2006/024146
PCT Pub. Date: Mar. 9, 2006

(65) Prior Publication Data
US 2011/0154907 A1   Jun. 30, 2011

(30) Foreign Application Priority Data

Aug. 30, 2004 (CA) ..................................... 2479460
Aug. 30, 2004 (CA) ..................................... 2479497

(51) Int. Cl.
*G01L 1/24* (2006.01)
(52) U.S. Cl. ........................................................ 73/800
(58) Field of Classification Search .................. None
See application file for complete search history.

(56) References Cited

U.S. PATENT DOCUMENTS

| 3,229,511 A | 1/1966 | Rossire |
| 5,383,368 A | 1/1995 | Franke et al. |
| 5,656,783 A | 8/1997 | Frisch et al. |
| 2005/0193830 A1* | 9/2005 | Suzuki ............................ 73/800 |
| 2007/0006662 A1* | 1/2007 | Giazotto ......................... 73/800 |

FOREIGN PATENT DOCUMENTS

| EP | 0066923 | 12/1982 |
| EP | 0 105 569 A | 4/1984 |
| WO | 01/18487 A1 | 3/2001 |
| WO | 2005022098 | 3/2005 |

OTHER PUBLICATIONS

International Search Report and Written Opinion issued Dec. 29, 2005, in PCT Application No. PCT/CA05/001304.
Extended European Search Report for European Patent Application No. 05 77 8712 with a mailing date of Dec. 15, 2009.
International Preliminary Report on Patentability for International Application No. PCT/CA2005/001304, mailed Mar. 8, 2007, which includes the Written Opinion of the International Searching Authority.

* cited by examiner

*Primary Examiner* — Andre Allen
(74) *Attorney, Agent, or Firm* — Katten Muchin Rosenman LLP (57) ABSTRACT

The present invention provides a structural deflection and load measuring device for mounting on an axle. The device includes at least one light beam emitting device connected to the axle and able to emit at least one light beam and at least one light position sensing device connected to the axle. The sensing device is located relative to the light beam emitting device for receiving at least one light beam from the light beam emitting device thereon and is operable to calculate the position of the light beam received on its surface.

30 Claims, 8 Drawing Sheets

STRUCTURAL DEFLECTION AND LOAD MEASURING DEVICE

FIELD OF THE INVENTION

The present invention provides a means for measuring the bending/shear deflection of a structure, and through knowledge of the type of structure, provides means to determine the loads/forces applied to the structure. The present invention provides means for measuring structural deflections in general, and axle deflections in particular. More particularly, the present invention provides means to measure the deflections of aircraft landing gear axles and for determining the loads applied thereto.

BACKGROUND OF THE INVENTION

An axle is generally described as a supporting shaft for a rotating wheel(s) or gear(s). Axles are used in many different environments, including in automobiles and aircraft. In general use, an axle may be required to sustain varying weights placed upon it and therefore its structural integrity may be important to its lifespan. For example, in an aircraft application there will be an increase in the load placed on the axle when the plane is stationary and being loaded with passengers, cargo and fuel. An even greater load will be placed on the axle when the wheels and the axle to which they are attached come into contact with the runway upon landing. It is therefore desirable to monitor the condition of the axle to ensure that it is not damaged or in need of servicing or maintenance.

Knowing the forces applied to aircraft landing gear axles provides for the determination of aircraft weight and balance, which is of interest to aircraft operators. The weight (mass of the aircraft, fuel, occupants, and cargo) and balance (the position of the centre of gravity of the aircraft) are critical factors that require measurement or calculation prior to every flight. Currently, almost every aircraft departs using calculated weight and balance values. These calculated values are based on average weights, not the actual weights of passengers and baggage, so aircraft operators must limit the usage of their aircraft to a narrower band of weight and balance values than that set by the aircraft manufacturer. This limits the utilisation of the aircraft, and reduces its potential revenue. In addition, the calculations are performed manually in some instances, and in others by central calculation departments. If a method of measuring the weight and centre of gravity existed that could reliably determine these values, the usage of the aircraft would increase (more passengers/cargo could be carried, and the costs to aircraft operators to determine the values could be significantly reduced.

A number of attempts to determine the weight of aircraft have been tried, with various degrees of success. The benchmark are stationary scales that an aircraft rolls onto, such that each landing gear or landing gear wheel is weighed. This method provides the standard to which all others are compared, but since the scales are not carried aboard the aircraft, and since the weighing procedure typically takes a significant amount of time, this method is not appropriate for the determination of the aircraft weight and balance prior to each flight. A number of flyable approaches have been attempted. In all these methods the landing gear, or portions thereof, form the element on which the measurement will be made since the landing gear, and its associated wheels and tires, are where the aircraft's weight is reacted by the ground. One of the earliest approaches to determining the weight over a landing gear was by measuring the pressure of the gas in the gas spring that supports the aircraft. This method suffers from a lack of accuracy due to the friction of the gas and oil seals in the strut which carry some of the load. Methods exist (Nance) to account for this friction, but these are either based on empirical data or require complicating the gas oil strut of the landing gear with various valves, tubes, and actuators that by their existence reduce the reliability of the landing gear system.

Other methods have been tried that more directly relate to the present invention—they work by attempting to measure the deflection of the landing gear axles. A direct approach uses strain gauges, either bonded to the axle, or bonded to a sensor fitted within the axle. Strain gauges use conductive metal that when stretched or compressed will cause an increase or decrease in electrical resistance across the material. The amount of change in the electrical resistance can be used as a measurement of the strain or deflection that the component to which the strain gauge is attached to is under. Such gauges have limitations based on the constriction of the elastic limits of the material used and the lack of high accuracy that can occur in the measurement readings. In addition, strain gauged based systems suffer from a lack of longevity in landing gear applications related to their reliance on mechanical bonding (gluing) of the gauge to the area of interest. Another point of failure of strain gauges is through corrosion where the electrical leads are terminated to the gauge. These terminations are by necessity in a harsh environment (the aircraft landing gear axle) and typically do not survive long in service.

A further attempt to measure the shear deflection of the axle has been fielded. This system employs a variable reluctance sensor which operates by measuring directly the displacement of the landing gear axle. The sensor is bolted to specially machined lugs on the exterior of the landing gear axle. In practice the system is expensive due to the requirement for machining lugs on a part which would be normally have been turned in a lathe and difficult to calibrate and use.

Other systems, which have been contemplated or demonstrated, include systems that directly measure material properties of a component to which they are attached, i.e. the axle. Such measurements (such as Barkhausen noise and other magnetic domain measurements) are then compared to predetermined material measurements and can be used to determine any potential stress on the component material. Many of these systems are experimental and have not had their reliability proven. In addition, there are questions as to how certain material properties of interest to these sensors change naturally with time. For instance, the Barkhausen noise properties of steel may change naturally over the life of a landing gear, confounding the original calibration.

In addition to the interest in measuring the weight of an aircraft, it is of interest to measure the forces acting on a landing gear in order to better determine the structural life and integrity of said landing gear. A method to measure axle deflections could provide a significant amount of information towards the determination of landing gear structural life.

SUMMARY OF THE INVENTION

The present invention provides a structural deflection and load measuring device for mounting on an axle comprising at least one light beam emitting device connected to the axle and operable to emit at least one light beam and at least one light position sensing device connected to the axle and located relative to the light beam emitting device. The at least one light position sensing device comprising at least two independent locations for receiving an incident beam and operable to measure the at least two independent locations. The at least two independent locations may be located on the same or different light position sensing devices.

The present invention further provides a refractive optical device located between the at least one light position sensing device and the at least one light emitting device and within the path of the light beam for refracting the light beam prior to being received on the light position sensing device.

The present invention further provides a device that includes at least one light beam emitting device and at least one light position sensing device being located proximal to each other, for example within the same plane, and a reflective optical device which is located at a position distal from the at least one light beam emitting device and the at least one light position sensing device and positioned to reflect the beam emitted from the at least one emitting device onto the at least one position sensing device.

The present invention further provides a housing to contain the structural deflection and load measuring device described herein and for mounting on or within an axle.

The present invention further provides a structural deflection and load measuring device comprising a first light beam emitting device operable to emit at least one light beam and a first light position sensing device for receiving the first light beam and a second light beam emitting device operable to emit at least one light beam and a second light position sensing device located relative to the second light beam emitting device for receiving at least one light beam emitted from the second light beam emitting device thereon. The device further comprises a refractive optical device located between the second light emitting device and the second light position sensing device for enhancing the deflection of the second light beam.

The present invention further provides transmitting means connected to the at least one light position sensing device for transmitting the measured locations of the light beam. Preferably the device also comprises a processor which is connected to the transmitting means and operable to calculate at least one of weight, balance and load of the aircraft using the measured location(s) of the light beam.

The present invention further comprises a method for measuring axle deflection using an optical axle deflection sensor comprising at least one light emitting device connected to the axle and at least one light position sensing device connected to the axle and located relative to the light beam emitting device for receiving at least one light beam from the light beam emitting device thereon, the method comprising the steps of (i) measuring the position of the light beam from the light beam emitting device on the light position sensing device when no load is applied to the axle (ii) applying a load to the axle and re-measuring the position of the light beam on the sensing device (iii) comparing the position of the light beam in (i) with (ii) and calculating the light beam deflection; and (iv) calculating the axle deflection using the light beam deflection calculated in (iii). The method further comprises using the calculated axle deflection of step (iv) to determine at least one of weight, balance and load on the axle.

The present invention further comprises a structural deflection and load measuring device for mounting on a dual wheel axle comprising a housing for mounting on the axle; at least one mirror assembly for mounting on the inside of at least one wheel hub cap connected to the wheel axle, at least one light beam emitting device contained within the housing and operable to emit at least one light beam towards the mirror assembly and at least one light position sensing device contained within the housing and located adjacent the light beam emitting device for receiving the at least one deflected light beam from the mirror assembly thereon and operable to calculate the position of the light beam received thereon.

The present invention further provides a mirror assembly comprising a plurality of light absorbing elements. The light absorbing elements may be radially extending elements, for example radially extending stripes. The mirror assembly may include at least one mirror and at least one of a reflective lens and a refractive lens.

The present invention further provides a system for measuring the weight, balance and/or load of an aircraft comprising at least one structural deflection and load measuring device described herein located on each axle of the aircraft. The present invention further provides a system for measuring the weight, balance and/or load of an aircraft including additional structural deflection and load measuring devices mounted at predetermined positions on the aircraft landing gear, for example on a bogie beam.

The present invention further provides a structural deflection and load measuring device for mounting on an axle comprising a housing for mounting on the axle a first light beam emitting device contained within the housing and operable to emit at least one light beam, a first light position sensing device contained within the housing and located relative to the light beam emitting device for receiving at least one light beam from the first light beam emitting device thereon and operable to calculate the position of the light beam received thereon, a second light beam emitting device contained within the housing and located adjacent the first light beam emitting device, a second light position sensing device contained within the housing and located relative to the second light beam emitting device for receiving the light beam emitted from the second light beam emitting device and operable to calculate the position of the light beam received thereon and a refractive optical device located between the second light emitting device and the second light position sensing device.

The present invention further provides a structural deflection and load measuring device for mounting on a dual wheel axle comprising a housing for mounting on the axle, at least one mirror assembly for mounting on the inside of at least one wheel hub cap connected to the wheel axle, at least one light beam emitting device contained within the housing and operable to emit at least one light beam towards the mirror assembly, at least one light position sensing device contained within the housing and located adjacent the light beam emitting device having at least two independent locations for receiving an incident beam and operable to measure the at least two locations. The present invention further provides the device above wherein the at least two independent locations are located on either the same light sensing device or different light sensing devices.

BRIEF DESCRIPTION OF THE DRAWINGS

Embodiments of the present invention will be described in further detail below, with reference to the accompanying figures in which.

DETAILED DESCRIPTION OF THE PREFERRED EMBODIMENTS

The present invention will now be described in further detail with reference to FIGS. 1 through 6. The present invention provides a structural deflection and load measuring device, also referred to herein as an optical axle deflection sensor or a deflection sensor, having at least one light beam emitting device and at least one light position sensing device. The at least one emitting device and the at least one sensing device are mounted on an axle at a spaced apart distance from each other. The position of the at least one light beam emitting device relative to the at least one sensing device provides that the light beam emitted from the at least one light beam emitting device projects onto the at least one sensing device when no axle deflection is occurring. Preferably the light beam is projected on to an area of the at least one sensing device at a position that maximises the useful resolution of the sensor. The initial position being chosen when no axle deflection is occurring. For example, the position of the light beam/dot may be chosen to be fairly close to the edge of the sensor for measurements of weight/vertical force. This position may be chosen since the magnitude of the loads in the aircraft weight direction are significantly greater that the loads in the opposite direction which come mostly from the inertial loading of the wheels, tires, and brakes during free extension of the shock strut. However, for the fore/aft (drag load) the position of the light beam/dot may be in the centre.

Figure 1:
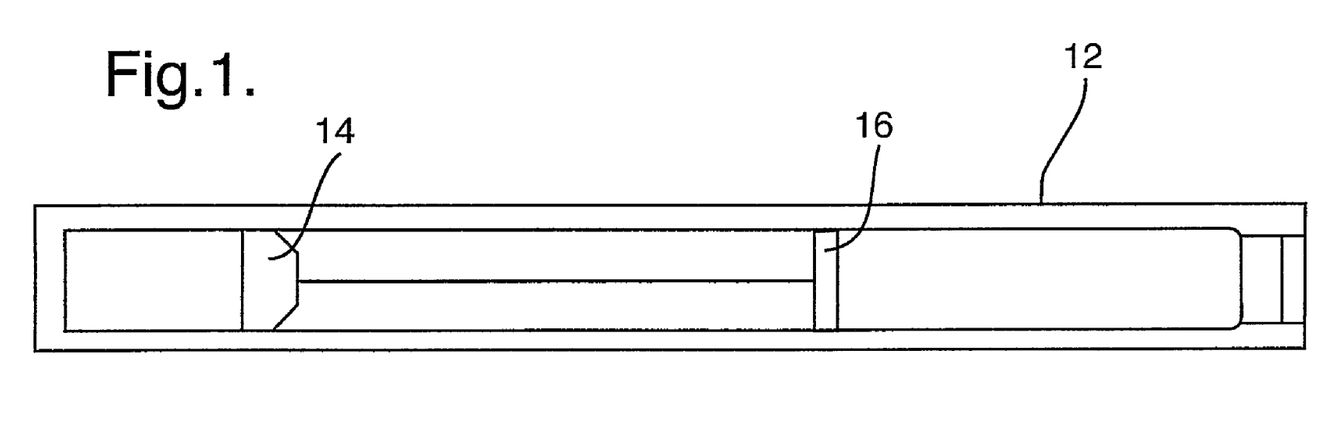
FIG. 1 is a side view of one embodiment of the optical axle deflection sensor of the present invention.
Figure 2:
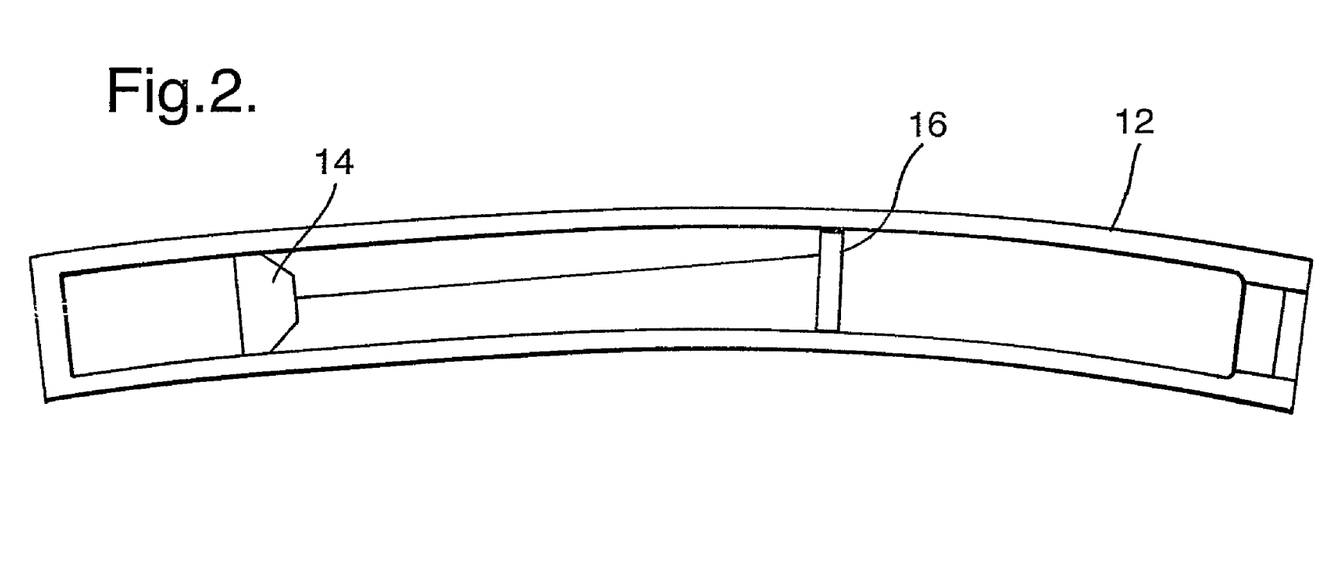
FIG. 2 is a side view of the optical axle deflection sensor of FIG. 1 shown in a deflected state, with a load applied on the axle.

One embodiment of the present invention will now be described with reference to FIGS. 1 and 2 in which the optical axle deflection sensor is indicated generally at numeral 10. The optical axle deflection sensor 10 is mounted to an axle, which is indicated generally at numeral 12. The optical axle deflection sensor 10 uses a light beam emitting device 14 and a light position sensing device 16, which may also be referred to as a detector or sensor. The light beam emitting device 14 emits at least one light beam which is received, in the form of a light image or dot, on a surface of the light position sensing device 16.

When no load is placed on the axle 12 the light beam emitted from the emitting device 14 projects an image or dot onto the centre of the surface of the sensing device 16. When a load is applied on the axle 12 the light beam will deflect relative to the amount of the load and will be received on the surface of the sensing device at a position that differs from the no load position. The deflection of the light beam may be very small when lighter loads are applied on the axle relative to the deflection that occurs when heavy loads are applied.

The light beam emitting device 14 may be any device from which at least one light beam is emitted. Examples of light beam emitting devices are known in the art and may be, but are not limited to, for example, a light emitting diode or laser. The light position sensing device 16 may be any device that is operable to detect, or sense, at least one light image received thereon, for example a light dot or a light image or shape, such as a circle or ellipse. Examples of light position sensing devices are known in the art and may be, but are not limited to, a position sensitive detectors (PSD) or an optical image sensor such as a charge coupled device (CCD) or complementary metal oxide semiconductor (CMOS) image sensor.

Position-sensitive detectors are photodiodes that are able to detect the position of a light spot, or dot, projected onto its surface. The information relating to the signal is calculated from the magnitude of the photocurrent signals provided on the PSD. Charge coupled devices are integrated circuits containing an array of linked capacitors which when hit by light emit electrons which can in turn be measured and used to calculate the position of the image/dot. The information relating to the position of the image or dot can then be relayed to a processor or control system that is capable of manipulating this information and correlating the change in position of the image/dot, i.e. the deflection, into information relating to the vertical and drag load on the axle.

As stated above, the light beam emitting device 14 and the light position sensing device 16 are mounted to the axle such that they are spaced apart a distance and aimed at each other such that at no deflection of the axle the light beam emitted from the emitting device projects a dot, or image, at a position on the sensing device 16. The light beam emitting device 14 and the light position sensing device 16 are mounted in order that both devices are held at fixed locations relative to the axle to ensure that the movement of the axle is reflected, and subsequently measured, in the projection of the light beam.

Figure 3:
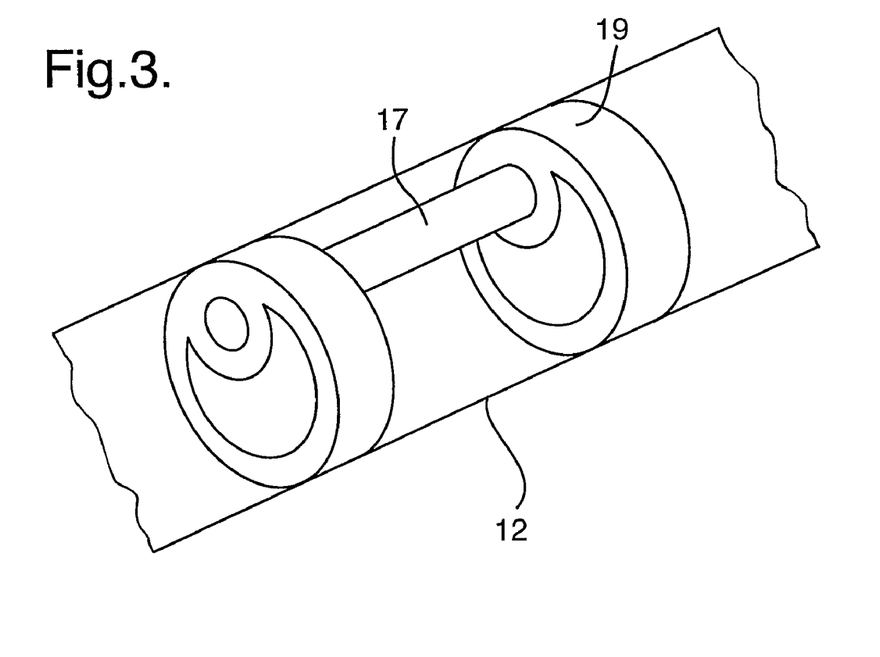
FIG. 3 is a schematic of the an alternative embodiment of the optical axle deflection sensor of the present invention.

FIG. 3 illustrates one embodiment of the mounting of the sensor 10 to the axle. In this embodiment the emitting device 14 and the sensing device 16 are located within a housing 17 that is mounted within the axle 12. The housing 17 is attached at peripheral ends to first and second rings 19 that are fitted within the internal portion of the axle, through an interference fit. It will be understood that this attachment is by no means limiting and other ways of attaching the housing 17 to the internal portion of the axle may be used. For example, the housing 17 may include flange portions at either end that can be directly attached to the internal portion of the axle, for example by welding or using bolts. Alternatively the housing 17 may be attached to the external surface of the axle. The attachment to the external surface may be through any means already discussed and those known to a person skilled in the art. For example, the housing may be attached at peripheral ends to rings that fit around the external surface of the axle, i.e. the axle passes through the internal portion of the rings, or alternatively the rings may include flanges or other attachment means by which the rings are connected to the axle.

Any load that is applied on the axle 12 will cause a deflection in the beam that is produced by the light beam emitting device 14, relative to its stationary position when no force is applied to the axle 12. When the beam from the light beam emitting device 14 is deflected, the light dot, or image, 18 on the sensing device 16 moves proportional to the deflection. The measurement of the position of the light dot 18, and in particular of the change in the position of the light dot 18 relative to its stationary position is used to calculate the amount of deflection of the axle which in turn allows for the determination of the axle load.

Since the deflection sensor 10 of the present invention may be used to determine axle loads it will be understood that the deflection sensor 10 may therefore be used in any structure on which a load/force is placed that causes a deflection of the structure relative to its at rest state. For example, and as described herein, the deflection sensor 10 may be used on an aircraft landing gear.

The use of a two dimensional light sensor 10 allows the beam deflections to be characterized in two dimensions, i.e. for instance up and down, and fore and aft. When used on an aircraft landing gear, these deflections may be correlated to, for example, aircraft vertical load or weight and drag loads, for example from braking.

Depending on the applied load, the relative movement of the light beam emitted from the light beam emitting device 14 compared to the original stationary, no load, position may be quite small, for example if a relatively small load is applied. Therefore in order to be able to measure small movements in the position of the light beam on the light position sensing device 16 it may be beneficial to incorporate within the sensor 10 an optical device that is capable of amplifying the movement of the light beam.

Figure 4:
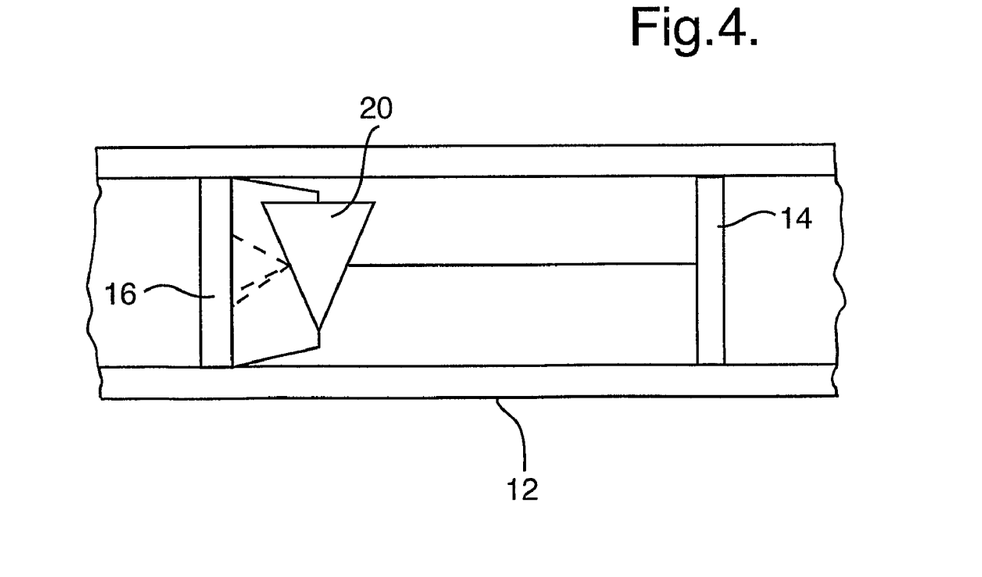
FIG. 4 is a side view of the optical deflection sensor of FIG. 1 using a prism to amplify the deflection of the light beam.

In a further embodiment, illustrated in FIG. 4, in the deflection sensor 10 described above, the light beam emitted from the at least one light beam emitting device 14 may therefore be split using optics, such as a prism or a refractive lens, to force the beam to travel a greater distance across the light sensing device 16, i.e. to amplify the deflection. In the embodiment illustrated a prism 20 is connected to the portion of the sensor 10 that includes the light position sensing device 16. Examples of other optical devices that may be used are known to persons skilled in the art.

Figure 5A:
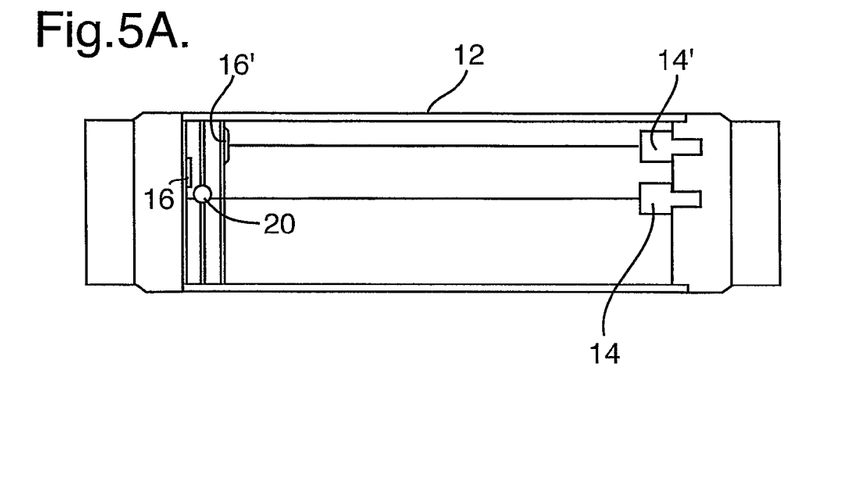
FIGS. 5A-C illustrate three separate measurement states for a further embodiment of the optical axle deflection sensor of the present invention.
Figure 5B:
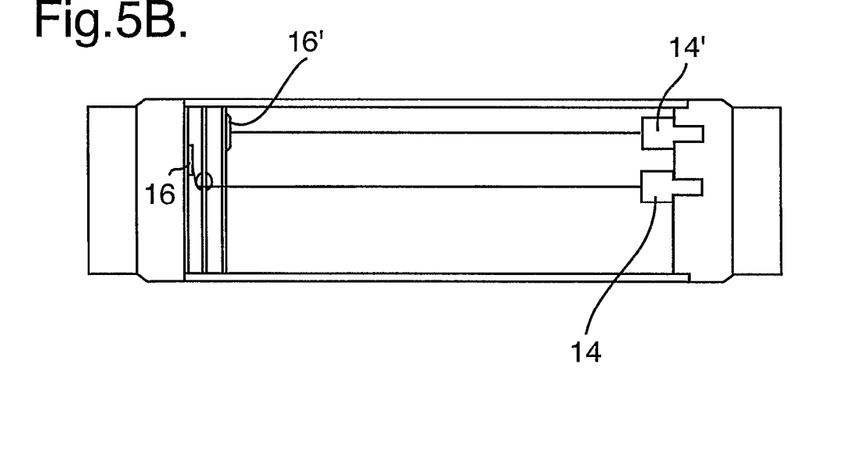
Figure 5C:
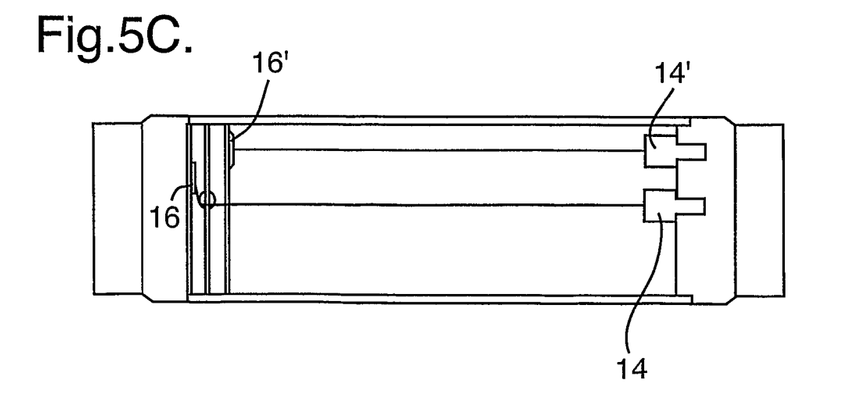

An alternative embodiment is illustrated in FIGS. 5A-C in which the optical axle deflection sensor 10 includes two light beam emitting devices 14 and two light position sensing devices 16. The light beam emitting devices 14,14' are located at one end of the axle 12 and the light position sensing devices 16,16' are located at a distance from the emitting devices 14,14', and close to the opposing end of the axle 12. One of the light beam emitting devices is located at a higher position, referred to as the "upper" device 14' relative to the second light beam emitting device 14. The upper emitting device 14' sends a beam on a direct path to one of the detectors 16' whereas the lower emitting device 14 sends a beam that passes through an optical deflection device 20, shown in FIG. 5 as a spherical lens, and then onto the second detector 16. The optical deflection device 20 may be any optical device that provides a magnification of the movement of the light beam, as discussed earlier, i.e. a magnification in the increase in the angle of deflection of the light beam.

When a large load is applied on the axle 12 the light beam emitted from the upper emitting device 14' will undergo a large deflection which can be measured by sensing device 16. However, if a small load is applied then only a small deflection in the light beam will occur. In this instance, the deflection of the light beam emitted from the lower emitting device will be amplified upon passing through the optical deflection device 20 and therefore a large deflection may be measured on the second detector 16.

As discussed above, the deflection sensor may be used on an axle in aircraft landing gear. When the landing gear axle undergoes a large deflection, as is the case when an aircraft comes in for a landing, the detector 16' takes the direct measurements, i.e. not through the optical deflection device 20, may be used for the calculation of the light beam deflection. Axle deflection values in this case may range from 1 to 2 mm, which may be an easily detectable distance range for the detector 16' being used. When the landing gear axle 12 undergoes a small deflection, as is the case when a plane is stationary on the ground during loading, the detector 16 takes measurements from the beam that passes through the optical deflection device 20. With the small deflection, the incident beam coming from the lower emitting device 14 moves only a small amount relative to the original position. However, the refracted beam exiting the optical deflection device 20 moves a much larger distance against the detector's surface. For example, a 5 micrometer movement in the Y direction of the incident beam translates into a 500 micrometer movement along the detector's surface. By using the optical deflection device 20 to amplify the observed deflection, very small deflections of the axle 12 can be measured.

Figure 6:
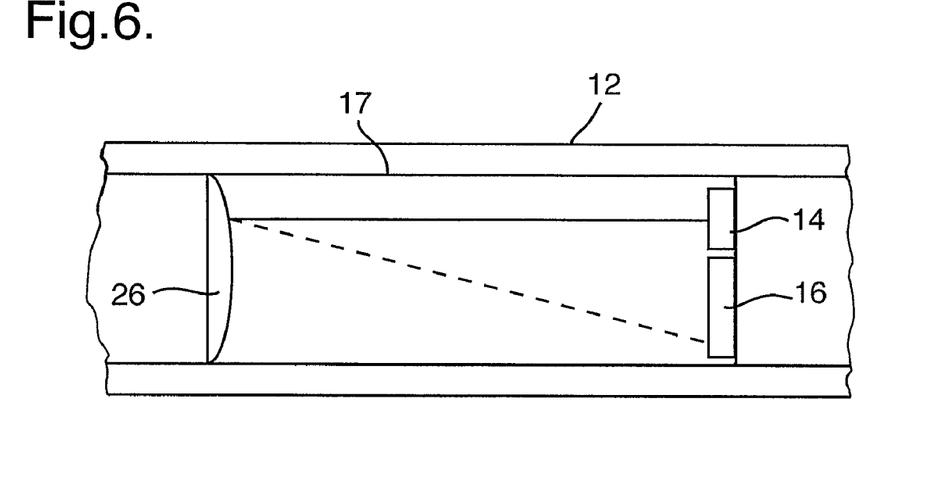
FIG. 6 illustrates a further alternative embodiment of the optical axle deflection sensor of the present invention using a reflecting device.

In a further embodiment, illustrated in FIG. 6, the optical axle deflection sensor 10 may include the use of at least one mirror 26, either plane or having a specific predefined curvature, in order that the light beam emitting device 14 and the light position sensing device 16 may be placed on the same side of the axle 12. The placement of the emitting device 14 and the point sensing device 16 being on the same side allow for both devices to be connected to the same electronic circuit board. The location of the components on the same electronic circuit board allow for the possibility to maintain all the components at the same temperature since they are located within close proximity to each other. Connection to the same circuit board will also reduce the number of wires and power sources that may be required for the components. The use of a mirror, or other reflective device, with a specific curvature may provide the capability to combine the amplification of deflection function along with the folding of the light beam such that the electronics may be mounted together.

Figure 7:
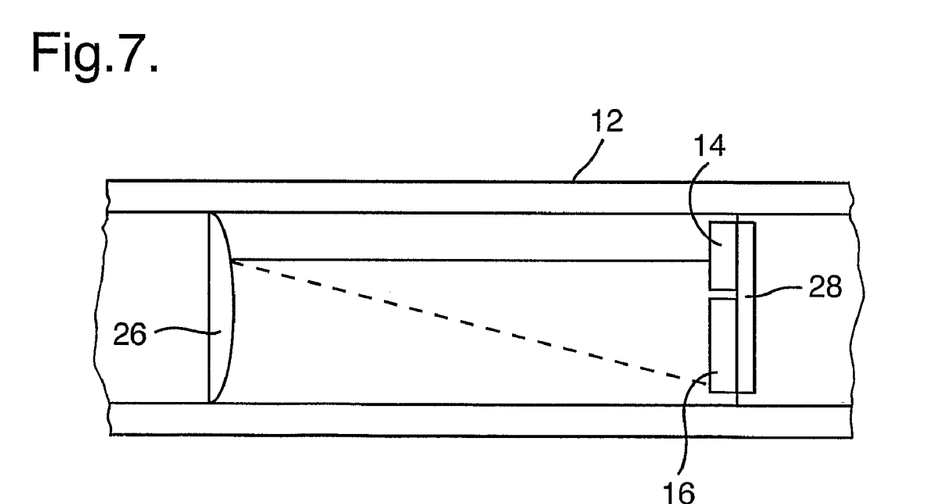
FIG. 7 illustrates an additional embodiment of the optical axle deflection sensor of the present invention including a thermal heater and cooler element.

In a further embodiment, illustrated in FIG. 7, the optical axle deflection sensor 10 includes at least one heating element 28. The heating element may be used to either provide heat to the sensor 10 or to cool the sensor 10. The heating element may include at least one thermal heater element 28 and/or at least one cooler element 30. The at least one thermal heater element 28 may be used to heat the environment of the sensor components when the sensor is used under extreme cold temperature conditions. The at least one cooler element 30 may be used to cool the environment of the sensor components when the sensor 10 is used under extreme heat conditions. The heater and cooler elements 28,30 may be separate components or they may be one component having the capability to provide both hot and cold temperature variations, for example a Peltier junction may be used to stabilize, under electronic control, the temperature of the emitter and detector. Environments where large variations in temperature occur are, for example, on aircraft landing gear where severe cold, due to high elevations during flight, and severe heat, due to braking, can occur. The heating and/or cooling elements 28,30 may be used to maintain the sensor 10 at a constant temperature when in use.

It will be understood that the sensor 10 described above can be used in many different applications. When used in aircraft landing gear, the sensor 10 may be used to measure weight/balance and therefore may only be used during loading of the plane. Alternatively, the sensor 10 may be used for health monitoring purposes, i.e. to monitor the applied loads placed on the axle during loading and during landing of the plane. The requirements for power and monitoring of the sensor 10 in each system will therefore vary. For example, if the sensor 10 is only being used to monitor the weight/balance during loading of the plane then power is only required for a short pre-determined period of time. The power source may therefore be supplied through ground control systems or the sensor 10 may be battery powered. In situations where the sensor 10 is being used to monitor the health of the aircraft landing gear then power may be supplied through a connection to the aircraft power system.

The embodiments described above generally refer to a light image or dot located on the surface of the point sensing device. The light image may be any shape that can project onto the surface of the sensing device and that can be measured by the sensing device to calculate a deflection from the original projected position. Examples of alternative shapes include circles that when deflected change shape to form an ellipse which indicates a deflection has occurred and the measurement taken can then be translated into an applied force on the axle. The use of certain images, for example a cross-like image may reflect torsional movement in the projected image on the sensing device. Image analysis software may then be used to correlate the change in image to a torsional force that has been applied to the axle.

The information obtained by the light position sensing device 16, i.e. the location of the light beam, may be transmitted to an on-board control system, or processor, for further manipulation or may be temporarily stored in or near the sensor 10 or may be transmitted to a ground control system. Systems and methods of relaying such information include the use of processors and transmitters and are known by persons skilled in the art.

The embodiment described above, includes a housing 17 that is used to contain the at least one light emitting device 14 and the at least one point sensing device 16 therein. The housing 17 may be a container which is closed and then attached by external means to the axle. Alternatively the housing 17 may be a cover that is positioned over the at least one light emitting device 14 and the at least one light sensing device 16. In this embodiment the light emitting device 14 is attached directly to the surface of the axle at a first point and the light sensing device 16 is attached directly to the surface of the axle at a second point, with all of the requirements of the positioning of the devices relative to each other, as described above. The cover may then be placed over the device to keep the devices 14,16 protected and to reduce the possibility of foreign bodies interfering with the light beam projection and measurements.

Figure 8A:
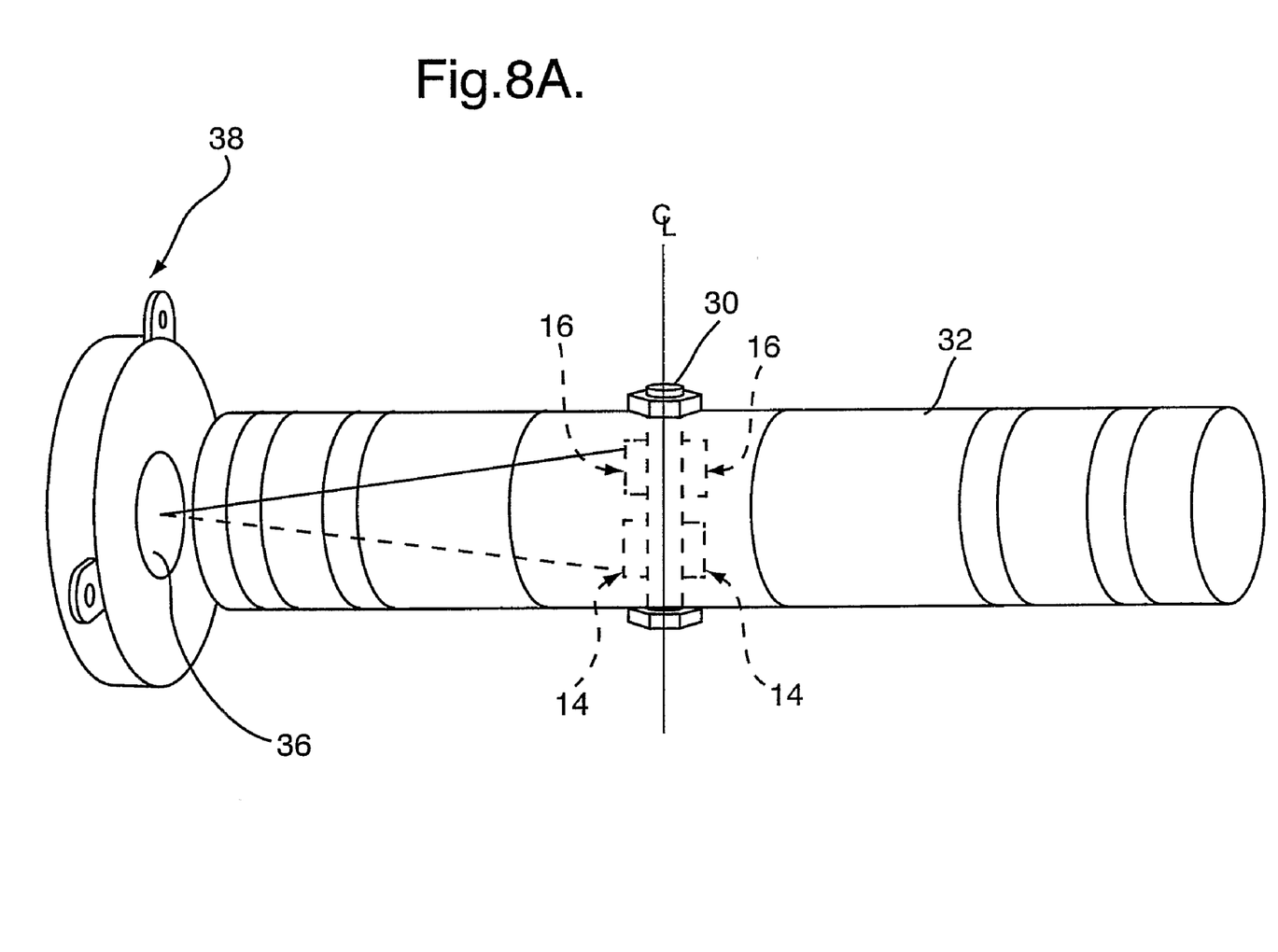
FIGS. 8A and B illustrates a further embodiment of the present invention for mounting on a dual wheel axle.
Figure 8B:
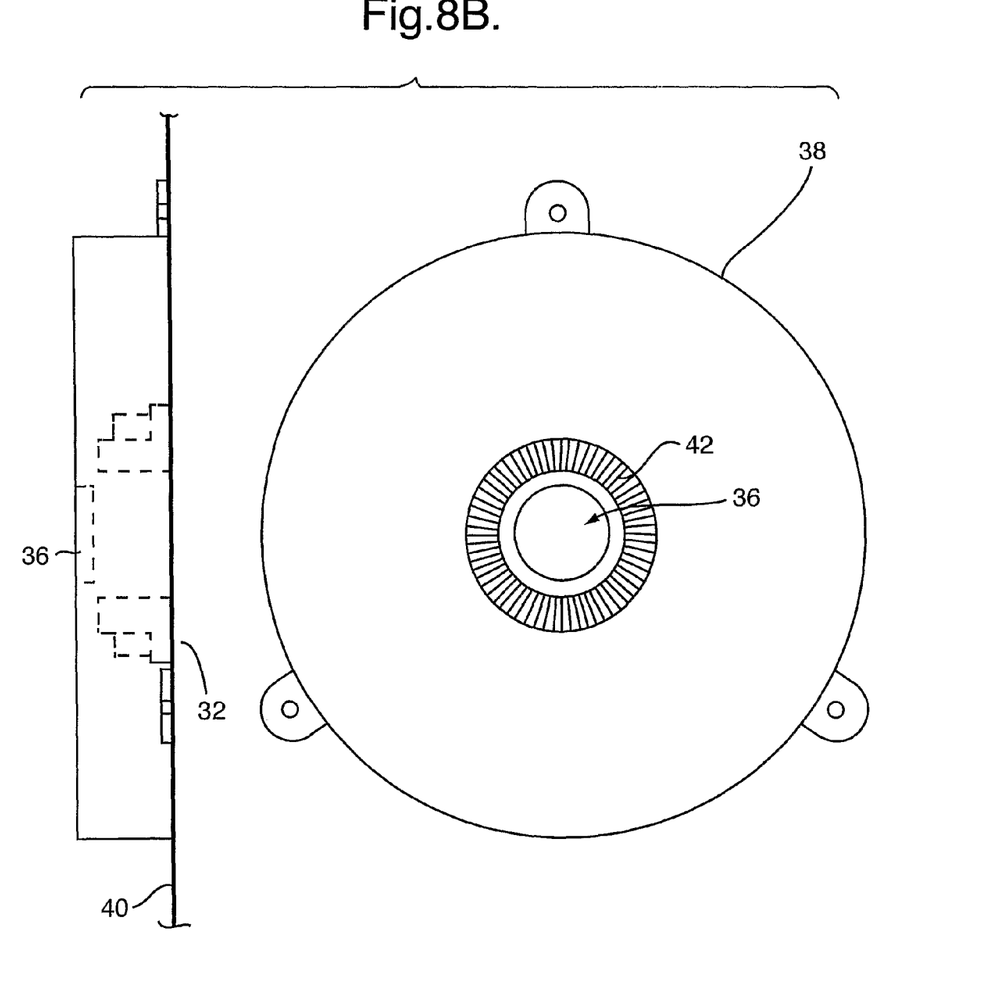

In yet another embodiment, illustrated in FIGS. 8A-B, a sensor package 30 is mounted at the midpoint of a dual wheel axle 32. The sensor package 30 contains a plurality of light emitting devices 14 and a plurality of light sensing devices 16. The package 30 is installed through a hole at the midpoint of the axle such that at least one set of light emitting devices 14 and light sensing devices 16 face towards one end of the axle shaft, and at least one other set of light emitting devices 14 and light sensing devices 16 face towards the other end of the axle shaft. By placing the sensor package 30 in such a way that it is insertable through the hole in the axle shaft 32, the sensor package 30 may be replaced or repaired in the field. A mirror or mirror and lens assembly 34 is mounted to the inside of the hub cap, not shown, (which is rigidly attached to the wheel which rotates on the axle). This mounting arrangement allows for rapid and simple removal and replacement of the components while an aircraft is in service.

In a further embodiment, an additional light emitting device 14 and a light sensing device 16 can be added to the sensor package 30 of the embodiment above, with the additional light emitting device 14 axis offset from the neutral axis of the axle 32. A plane mirror or other optical device 36 mounted to the inside of the hubcap 38, of wheel 40, will have a series of radial strips 42 etched or painted on to reduce or eliminate the reflectivity of the optical device 36. This would cause the light sensing device 16 to receive a series of pulses during wheel rotation that would be proportional to the wheel speed and the number of strips (a fixed constant). This system would allow the incorporation of wheel speed measuring equipment within the axle load detecting system in order to simplify the equipment currently mounted in an aircraft axle.

Figure 9A:
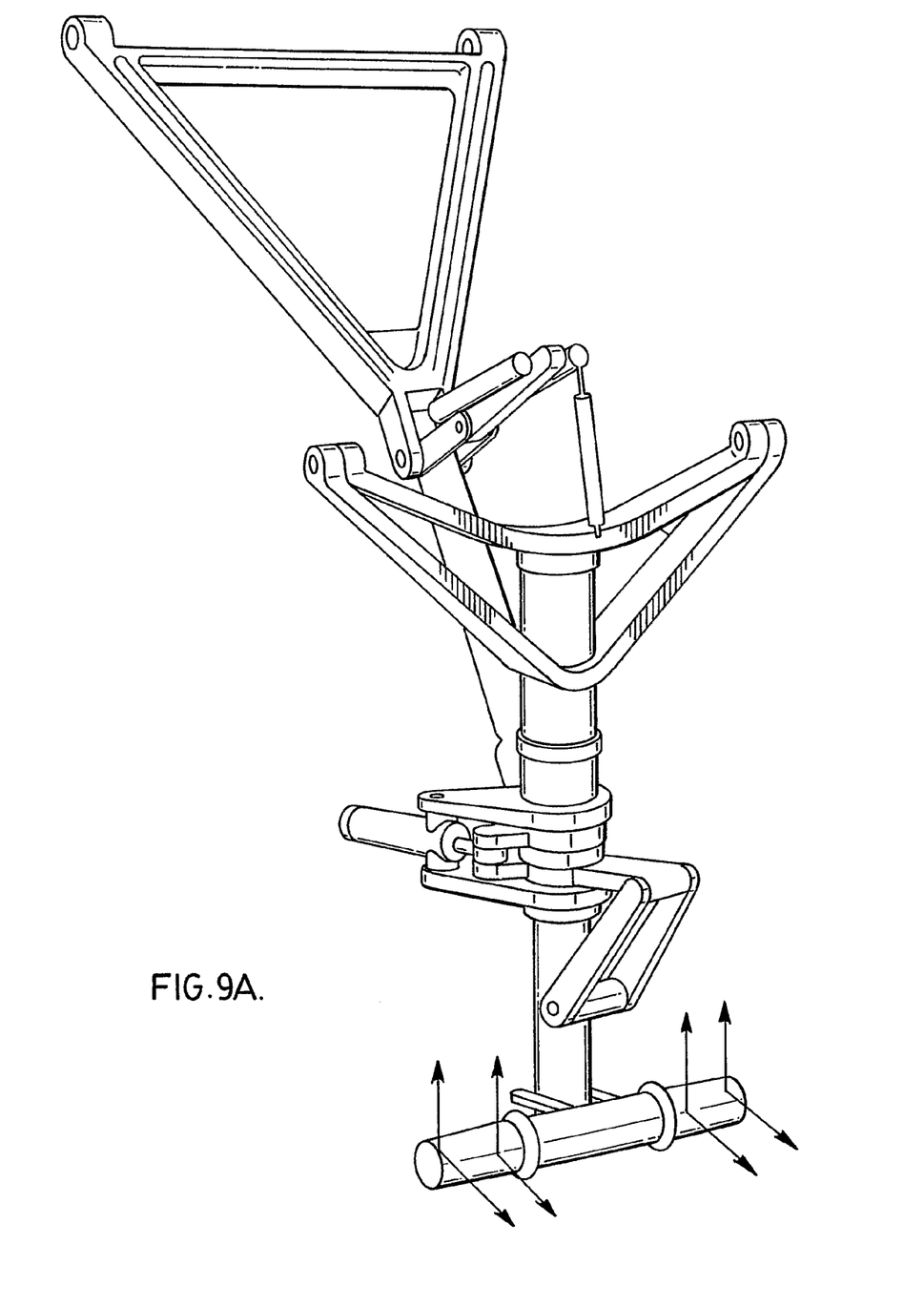
FIG. 9a is an example of nose landing gear of an aircraft.
Figure 9B:
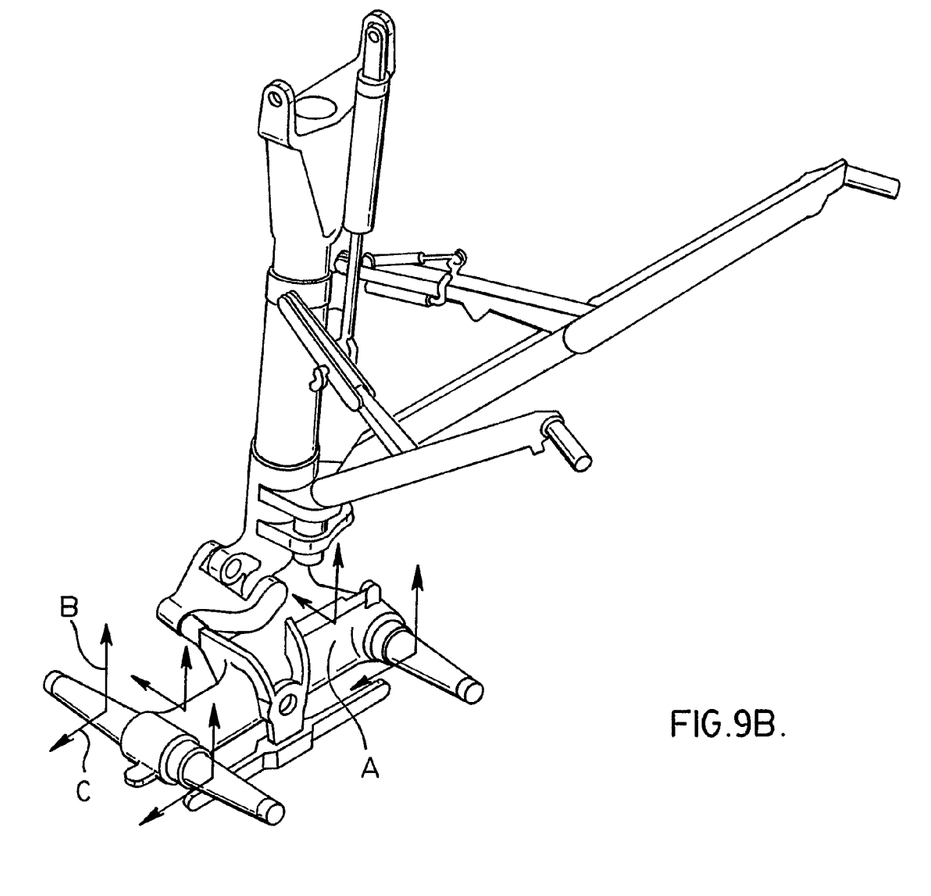
FIG. 9b is an example of main landing gear of an aircraft.

The invention will now be described in further detail with regard to the use of the structural deflection and load measuring device of the present invention in an aircraft landing gear. In a typical tricycle arrangement of landing gear there is included a left main landing gear and a right main landing gear and a nose landing gear. An example of the left/right main landing gear is illustrated in FIG. 9A and an example of the nose landing gear is illustrated in FIG. 9B. To achieve a weight and balance calculation for an aircraft the vertical force acting upon each axle is required. The weight of the aircraft is the sum of all the vertical loads and constant weights for the wheels, brakes and tires.

In a cantilever arrangement, the axle remains in a fixed position relative to the ground. The axle translates across the ground and its orientation remains stable. In this type of arrangement a one dimensional axle sensor, as known in the prior art, may be used. However, many landing gear arrangements are of the Bogie or articulated style. In these arrangements the angle that the vertical force acts on the axle varies with axle position, this is generally even more evident on an articulated landing gear. One dimensional sensors will therefore not read the vertical load accurately. However, the two dimensional sensor device of the present invention is operable to measure this load.

As will be understood by a person skilled in the art, using x and y force measurements and using the formula Vertical Load=$\sqrt{x^2+y^2}$ the true vertical load may be measured whenever the aircraft is static.

In a first application used to calculate the weight and balance of an aircraft the system is preferably dual redundant. This means that the system includes two light emitting devices and two light sensing devices. For example, the system may include the light emitting devices and the light sensing devices located on the same electronics board and preferably having separate power supplies. In this embodiment, the two light emitting devices are located in the same plane as the two light sensing devices and are positioned opposite an optical deflector, e.g. a mirror. Alternatively, the system may include two light emitting devices located in the same plane and opposite two light sensing devices. In both of these systems the dual light emitting and sensing devices are located within one housing. In a system for measuring weight and load balance of an aircraft one of the embodiments described above containing the dual emitting and sensing devices is attached to each axle of the aircraft.

In a second application used to monitor the load on the aircraft it is preferable to also include a measurement of the side loads. Therefore, in a bogie gear, additional sensor systems, as described above, are also included in the bogie beam, for example at position A illustrated in FIG. 9B, the measurement axes are indicated at arrows B and C. In a cantilever system, additional sensor systems, as described above, may be included in the piston.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments. Further, all of the claims are hereby incorporated by reference into the description of the preferred embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A structural deflection and load measuring device for mounting on an axle comprising:
   (i) at least one light beam emitting device connected to the axle and operable to emit at least one light beam; and
   (ii) at least one light position sensing device connected to the axle and located relative to the light beam emitting device, the at least one light position sensing device comprising at least two independent locations for receiving an incident beam and operable to measure the at least two independent locations; and
   (iii) at least one refractive optical device located between the at least one light position sensing device and the at least one light beam emitting device and within the path of the at least one light beam.

2. The structural deflection and load measuring device according to claim 1, wherein the one of the at least two locations is located on a first light position sensing device and the other is located on a second light position sensing device.

3. The structural deflection and load measuring device according to claim 1, comprising a plurality of light position sensing devices wherein the at least two independent locations for receiving an incident beam are located on different light position sensing devices.

4. The structural deflection and load measuring device according to claim 1, wherein the at least one light beam emitting device and the at least one light position sensing device are located proximal to each other and the sensor further comprises a reflective optical device located at a position distal from the at least one light beam emitting device and the at least one light position sensing device and positioned to reflect the beam emitted from the at least one emitting device onto the at least one position sensing device.

5. The structural deflection and load measuring device according to claim 1, further comprising at least one of at least one heating element and at least one cooling element.

6. The structural deflection and load measuring device according to claim 1, further comprising a housing for mounting on the axle, the housing being operable to contain the at least one light beam emitting device and the at least one light position sensing device therein.

7. The structural deflection and load measuring device according to claim 6, wherein the housing is mounted on the axle.

8. The structural deflection and load measuring device according to claim 1, further comprising a second light beam emitting device connected to the axle and operable to emit at least one light beam, a second light position sensing device connected to the axle and located relative to the second light beam emitting device for receiving at least one light beam emitted from the second light beam emitting device thereon, and a refractive optical device located between the second light emitting device and the second light position sensing device.

9. The structural deflection and load measuring device according to claim 1, further comprising transmitting means connected to the at least one light position sensing device for transmitting the calculated position of the light beam.

10. The structural deflection and load measuring device according to claim 9, further comprising a processor connected to the transmitting means and operable to calculate at least one of weight, balance and load of the aircraft using the calculated position of the light beam.

11. A method for measuring axle deflection using an optical axle deflection sensor according to claim 1, the method comprising the steps of:
   (i) measuring the position of the light beam from the light beam emitting device on the light position sensing device when no load is applied to the axle;
   (ii) applying a load to the axle and re-measuring the position of the light beam on the sensing device;
   (iii) comparing the position of the light beam in (i) with (ii) and calculating the light beam deflection; and
   (iv) calculating the axle deflection using the light beam deflection calculated in (iii).

12. The method of claim 11, further comprising using the calculated axle deflection of step (iv) to determine at least one of weight, balance and load on the axle.

13. A structural deflection and load measuring device for mounting on a dual wheel axle comprising:
   (i) a housing for mounting on the axle;
   (ii) at least one mirror assembly for mounting on the inside of at least one wheel hub cap connected to the wheel axle;
   (iii) at least one light beam emitting device contained within the housing and operable to emit at least one light beam towards the mirror assembly;
   (iv) at least one light position sensing device contained within the housing and located adjacent the light beam emitting device for receiving the at least one deflected light beam from the mirror assembly thereon and operable to calculate the position of the light beam received thereon; and
   (v) at least one refractive optical device located between the at least one light position sensing device and the at least one light beam emitting device and within the path of the at least one light beam.

14. The structural deflection and load measuring device according to claim 13, wherein the mirror assembly comprises a plurality of light absorbing elements thereon.

15. The structural deflection and load measuring device according to claim 14, wherein the plurality of light absorbing elements are radially extending elements.

16. The structural deflection and load measuring device according to claim 14, wherein the mirror assembly comprises at least one mirror and at least one of a reflective lens and a refractive lens.

17. The structural deflection and load measuring device according to claim 13, further comprising transmitting means connected to the at least one light position sensing device for transmitting the calculated position of the light beam.

18. The structural deflection and load measuring device according to claim 17, further comprising a processing connected to the transmitting means and operable to calculate at least one of weight, balance and load of the aircraft using the calculated position of the light beam.

19. A system for measuring the weight, balance and/or load of an aircraft comprising at least one structural deflection and load measuring device according to claim 1 located on each axle of the aircraft.

20. The system according to claim 19, further comprising additional structural deflection and load measuring devices mounted at predetermined positions on the aircraft landing gear.

21. A structural deflection and load measuring device for mounting on an axle comprising:
   a housing for mounting on the axle;
   a first light beam emitting device contained within the housing and operable to emit at least one light beam;

a first light position sensing device contained within the housing and located relative to the light beam emitting device for receiving at least one light beam from the first light beam emitting device thereon and operable to calculate the position of the light beam received thereon;

a second light beam emitting device contained within the housing and located adjacent the first light beam emitting device;

a second light position sensing device contained within the housing and located relating to the second light beam emitting device for receiving the light beam emitted from the second light beam emitting device and operable to calculate the position of the light beam received thereon; and a refractive optical device located between the second light beam emitting device and the second light position sensing device.

22. The structural deflection and load measuring device according to claim 21, further comprising at least one transmitting device for transmitting the calculated positions of the first and second light beams on respective first and second light beam sensing devices.

23. A structural deflection and load measuring device for mounting on a dual wheel axle comprising:
   (i) a housing for mounting on the axle;
   (ii) at least one mirror assembly for mounting on the inside of at least one wheel hub cap connected to the wheel axle;
   (iii) at least one light beam emitting device contained within the housing and operable to emit at least one light beam towards the mirror assembly;
   (iv) at least one light position sensing device contained within the housing and located adjacent the light beam emitting device having at least two independent locations for receiving an incident beam and operable to measure the at least two locations; and
   (v) at least one refractive optical device located between the at least one light position sensing device and the at least one light beam emitting device and within the path of the at least one light beam.

24. The structural deflection and load measuring device according to claim 23, wherein the device comprises a plurality of light position sensing devices and the at least two independent locations are located on separate light position sensing devices.

25. The structural deflection and load measuring device according to claim 23, wherein the at least two independent locations are located on the same light position sensing device.

26. The structural deflection and load measuring device according to claim 23, wherein the mirror assembly comprises a plurality of light absorbing elements thereon.

27. The structural deflection and load measuring device according to claim 26, wherein the plurality of light absorbing elements are radially extending elements.

28. The structural deflection and load measuring device according to claim 23, wherein the mirror assembly comprises at least one mirror and at least one of a reflective lens and a refractive lens.

29. The structural deflection and load measuring device according to claim 23, further comprising transmitting means connected to the at least one light position sensing device for transmitting the position of the at least two independent locations.

30. The structural deflection and load measuring device according to claim 29, further comprising a processor connected to the transmitting means and operable to calculate at least one of weight, balance and load of the aircraft using the transmitted position of the at least two independent locations.

* * * * *